(12) United States Patent
Bruder et al.

(10) Patent No.: US 7,940,884 B2
(45) Date of Patent: May 10, 2011

(54) METHOD AND IMAGE RECONSTRUCTION DEVICE FOR RECONSTRUCTING IMAGE DATA

(75) Inventors: Herbert Bruder, Höchstadt (DE); Thomas Flohr, Uehlfeld (DE); Rainer Raupach, Heroldsbach (DE); Karl Stierstorfer, Erlangen (DE); John Sunnegårdh, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/729,280

(22) Filed: Mar. 23, 2010

(65) Prior Publication Data

US 2010/0246751 A1  Sep. 30, 2010

(30) Foreign Application Priority Data

Mar. 25, 2009  (DE) .......................... 10 2009 014 726

(51) Int. Cl.
*A61B 6/00* (2006.01)
(52) U.S. Cl. .......................................................... 378/4
(58) Field of Classification Search .................... 378/4
See application file for complete search history.

(56) References Cited

U.S. PATENT DOCUMENTS

| 4,626,991 | A | * | 12/1986 | Crawford et al. .................. 378/4 |
| 5,907,594 | A | * | 5/1999 | Lai ..................................... 378/4 |
| 6,697,508 | B2 | * | 2/2004 | Nelson ........................... 382/131 |
| 7,430,269 | B2 | * | 9/2008 | Nielsen et al. ..................... 378/4 |
| 2006/0104409 | A1 | | 5/2006 | Bouman | |
| 2007/0093711 | A1 | | 4/2007 | Hoheisel et al. | |

FOREIGN PATENT DOCUMENTS

| DE | 102005050917 A | 4/2007 |
| WO | WO 2005076222 A1 | 8/2005 |

OTHER PUBLICATIONS

Johan Sunnegårdh, "Combining Analytical and Iterative Reconstruction in Helical Cone-Beam CT," Linköping Studies in Science and Technology, Thesis No. 1301, Feb. 2007, pp. 1-127.

(Continued)

*Primary Examiner* — Edward J Glick
*Assistant Examiner* — Alexander H Taningco
(74) *Attorney, Agent, or Firm* — Harness, Dickey & Pierce, P.L.C.

(57) ABSTRACT

A method and an image reconstruction device are disclosed for reconstructing image data on the basis of input projection data obtained via an X-ray computerized tomography system. A target convolutional kernel is selected, which, when reconstructing image data from the input projection data using simple filtered back projection, would lead to target image characteristics. Image data is then reconstructed using an iterative reconstruction method of at least one embodiment. In at least one embodiment, the method includes a) reconstructing image data of a first iterative stage from the input projection data, b) generating synthetic projection data on the basis of the image data of the current iterative stage, c) forming difference projection data on the basis of the input projection data and the synthetic projection data, d) generating residue image data from the difference projection data, e) combining the residue image data with the image data of the current iterative stage to form image data of an additional iterative stage, wherein the image data of the current iterative stage is subjected to filtering before or during combination with the residue image data by using a regularization convolutional kernel which is determined on the basis of the selected target convolutional kernel, and f) repeating b) to e) until a termination condition occurs.

18 Claims, 4 Drawing Sheets

OTHER PUBLICATIONS

Sunnegardh, J. et al; Regularized iterative weighted filtered backprojection for helical cone-beam CT. Medical Physics 35, vol. 9, Sep. 2008, p. 4173-4185.; Others; 2008.

Riddell, Cyril et al; Iterative Reconstruction of SPECT data with adaptive Regularization; IEEE Transactions on Nuclear Science, vol. 49, Oct. 2002, p. 2350-2354.; Others; 2002.

* cited by examiner

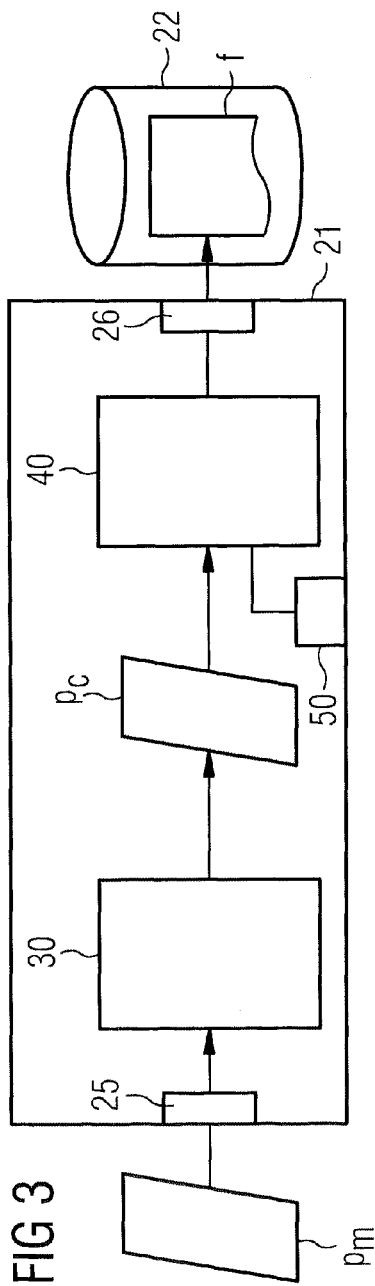
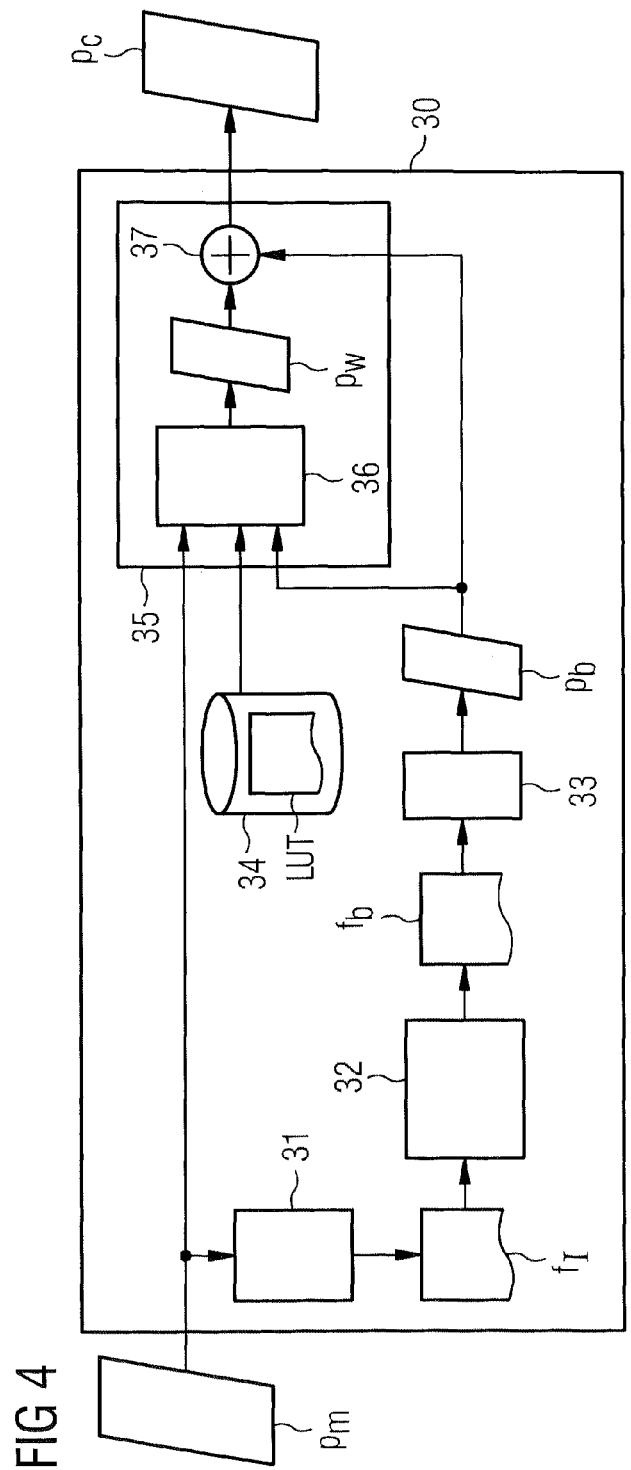

METHOD AND IMAGE RECONSTRUCTION DEVICE FOR RECONSTRUCTING IMAGE DATA

PRIORITY STATEMENT

The present application hereby claims priority under 35 U.S.C. §119 on German patent application number DE 10 2009 014 726.8 filed Mar. 25, 2009, the entire contents of which are hereby incorporated herein by reference.

FIELD

At least one embodiment of the invention generally relates to a method for reconstructing image data on the basis of input projection data obtained by way of an x-ray computerized tomography system. In at least one embodiment, it relates to a method wherein a target convolutional kernel is selected, which, when reconstructing image data from the input projection data using simple filtered back projection, would lead to target image characteristics. At least one embodiment of the invention also generally relates to a method for generating image data from inside an object, wherein a reconstruction method of this type is used. At least one embodiment of the invention also generally relates to an image reconstruction device for reconstructing image data using a method of this type and to an x-ray computerized tomography system having a projection data acquisition unit and a corresponding image reconstruction device.

BACKGROUND

These days what is known as a filtered back projection (FBP) method is used as the standard method for reconstructing CT scanned image data from X-ray CT data records of a computerized tomography device (CT device). In this method, the projection measured data acquired from the computerized tomography scanner is conventionally firstly pre-processed in order to free it as far as possible from noise. What is known as a "rebinning" step is then carried out in which the data generated with the beam that spreads from the source in a fan-shaped manner is rearranged such that it is in a form as if the detector had been struck by an X-ray wave front tapering parallel to the detector.

The data is then transformed into the frequency range. Filtering takes place in the frequency range by using a convolutional kernel which in most devices the operator can nowadays freely select from a menu using the user interface. Up to 80 different convolutional kernels are currently offered on some systems. The user can influence the image characteristics via the choice of convolutional kernel. Image characteristics include not just the image definition but also, for example, the image noise, granularity, texture and behavior in low-frequency bands, etc.

The user can therefore select for example whether he wants to reconstruct a very soft image or a very sharp image which, however, has greater granularity. The operator's selection can depend inter alia on the measuring situation, for example on which region of the images should be particularly well depicted and according to which objects or lesions are being sought. The filtered data is then inversely transformed. Using the data that has been re-sorted and filtered in this way back projection then takes place to the individual voxels within the volume of interest.

Owing to its approximative mode of operation problems with what are referred to as low-frequency cone beam artifacts and spiral artifacts occur with the conventional FBP methods, however. Furthermore, image definition is always linked to image noise in the case of conventional FBP methods. The greater the sharpness achieved, the higher the image noise also is, and vice versa.

Iterative reconstruction methods have therefore recently been developed with which these limitations may be eliminated. With such iterative reconstruction methods initial image data is firstly reconstructed from the projection measured data. A convolutional back projection method for example can be used for this purpose.

Synthetic projection data is then generated from this initial image data using a "projector" (projection operator), which is designed to mathematically depict the measuring system as well as possible. The difference from the measured signals is then back-projected with the adjoint operator, and a residue image is thus reconstructed with which the initial image is updated. The updated image data can in turn be used to generate new synthetic projection data in a next iterative step using the projection operator, form therefrom the difference from the measured signals again and calculate a new residue image with which the image data of the current iterative stage is improved again, etc. Using this type of method it is possible to reconstruct image data that has relatively good definition but still has low image noise.

One drawback of this iterative method in contrast to the simple back projection mentioned in the introduction, however, lies in the fact that the operator no longer has any direct influence on the image characteristics. In iterative reconstruction the image characteristics are influenced by the projector and the associated back projector used, and by what is known as the regularization term with which the gray scale values of adjacent image voxels are weighted with a potential function within iteration in order to achieve sufficient stability in the reconstruction. It is unclear in this connection how the different components need to be parameterized in detail to achieve certain image characteristics.

SUMMARY

In at least one embodiment of the present invention, a method for generating image data of an object and a corresponding image reconstruction device in which the image characteristics can be easily optionally adjusted by the operator in a manner similar to the choice of CT convolutional kernel.

In the case of at least one embodiment of the inventive method a type of "virtual" target convolutional kernel is firstly selected, i.e. a "desired convolutional kernel", which, when reconstructing image data from the input projection data, would lead to target image characteristics if it was used with simple filtered back projection.

The iterative reconstruction method itself, of at least one embodiment, then comprises the following:
a) Reconstructing image data of a first iterative stage from the input projection data. This means initial image data is firstly generated from the input projection data using conventional convolutional back projection by way of example.
b) Synthetic projection data is then generated on the basis of the image data of the current iterative stage (in the case of the first iterative stage from the initial image data accordingly). As described in the introduction, a projection operator that depicts the measuring process as well as possible is used for this purpose.
c) Difference projection data is then generated on the basis of the input projection data and the synthetic projection data of the current iterative stage. The difference projection data is therefore a measure of the deviation of the projection data that can be generated from the current image data from the actual input projection data, and therefore a measure of the quality of the generated image data of the current iterative stage.

d) Reside image data is then generated from the difference projection data.

e) This residue image data is finally combined with the image data of the current iterative stage to form image data of an additional iterative stage.

According to at least one embodiment of the invention the image data of the current iterative stage is in the process subjected to filtering before or during combination with the residue image data by using a regularization convolutional kernel which is determined on the basis of the selected target convolutional kernel. In other words, the regularization term used in iteration is accordingly influenced by the regularization convolutional kernel, and therefore by the target convolutional kernel as well, in such a way that image characteristics are ultimately formed in the convergence image of iteration which match the target image characteristics determined by the selected target convolutional kernel.

Steps b) to e) of at least one embodiment of this iterative method are repeated until a termination condition occurs. The termination condition can, for example, be selected such that iteration is terminated at the latest after a predefined number of iterative steps. Alternatively it is also possible to carry out iteration as a function of achieving a convergence criterion. Iteration can preferably be terminated if the difference projection data or the residue image data satisfy a threshold criterion.

With the aid of at least one embodiment of the inventive method the user is therefore provided with the possibility, as before, of specifying a target convolutional kernel and of thereby influencing the image characteristics. The advantageous iterative method can still be used to thus produce for example independence between image definition and image noise even within certain limits. Overall a significant improvement in reconstruction can therefore be attained.

In the case of at least one embodiment of the inventive method for generating image data from inside an object by way of an x-ray computerized tomography system, the object is x-rayed using x-ray radiation from a plurality of projection directions to acquire projection measured data. Reconstruction is then carried out on the basis of the projection measured data using the above-described reconstruction method of at least one embodiment. The projection measured data can, for example, firstly be pre-processed to generate the input projection data therefrom for at least one embodiment of the inventive method. Thus, for example, the projection measured data can firstly be filtered as usual and be freed from noise as far as possible and then a rebinning step can optionally also be carried out as described above. It is also possible for the projection measured data to be interpolated on the basis of actually measured detector projection measured data in this connection.

The projection measured data can be acquired in various ways, i.e. in a sequential method as well as in a helical method. The image data can similarly be reconstructed in various ways. For example individual section images can be reconstructed in a sequential method and these are then combined to form volume image data, or volume image data is reconstructed in a helical method from which individual section images can then also be generated.

A corresponding image reconstruction device for reconstructing image data according to at least one embodiment of the inventive method must have a projection measured data interface for accepting input projection data obtained by means of an X-ray computerized tomography system.

It also requires a target convolutional kernel selection unit for selecting a target convolutional kernel, which, when reconstructing image data from the input projection data using simple filtered back projection, would lead to certain image characteristics. This target convolutional kernel selection unit can be, for example, a user interface for direct selection of the target convolutional kernel by the user. Basically it can, however, also be a unit which, for example by taking account of various input parameters that characterize the measuring situation, automatically selects a suitable target convolutional kernel. Such input parameters that describe the measuring situation can be information about which object being examined is being photographed, for example whether it is a head photograph or an abdominal photograph, whether contrast medium is being used, which structures are being specifically sought, etc. Similarly, the operator could also choose desired image characteristics in a different way, for example from a selection of offered image characteristics. A target convolutional kernel linked to these image characteristics and stored for example in a table, is then automatically selected.

At least one embodiment of the inventive image reconstruction device also needs an iterative reconstruction unit which is adapted to reconstruct image data based on the input projection data using an iterative reconstruction method, and to use a reconstruction method as is described above in the process.

Finally the image reconstruction device requires an image data interface for outputting the reconstructed image data.

An image reconstruction device of this kind may be part of a computerized tomography system, i.e. it can, for example, be conventionally installed on a control and evaluation computer in the tomography system. Basically an image reconstruction device of this kind can also be implemented in the form of or on a different computer unit, however, which, for example, is connected for data transfer to a computerized tomography system via a network or can be provided with corresponding data in some other way.

In particular the iterative construction unit and optionally a target convolutional kernel selection unit can be implemented for automatic selection of a target convolutional kernel—as software modules on a suitable computer with corresponding storage capacities respectively. The raw data interface and the image data interface can also be implemented in the form of pure software if it is only necessary to accept the projection measured data or an image data output from or on other raw data pre-processing units or image data processing units implemented on the same computer unit. Basically these interfaces can, however, also be implemented as combined hardware/software interfaces in order to achieve external input/output, for example hardware interfaces specially configured with the aid of software components. Output of CT scanned image data should be taken to mean any output of CT scanned image data by the image reconstruction device, for example storing of image data in a memory for subsequent visual inspection or further processing, as well as external output onto a screen, printer or the like.

An implementation that is largely software-based has the advantage that even image reconstruction devices that have been used previously can be easily retrofitted by way of a software update in order to work in the inventive way. In this respect the object is also achieved by a computer program product which can be directly loaded into a memory of a programmable image reconstruction device, comprising program steps to execute all steps of the inventive method if the program is executed in the image reconstruction device.

Further advantageous embodiments and developments of the invention emerge from the further dependent claims and the description that follows. An inventive image reconstruction device of at least one embodiment can also be developed analogously to the method.

As already mentioned above, the regularization convolutional kernel is preferably determined by taking account of a projection operator used in above-mentioned step b) when generating the synthetic projection data.

The residue image data is, moreover, preferably generated from the difference projection data by means of a filtered back projection method by using a predefined back projection convolutional kernel. The regularization convolutional core is then also determined by taking account of this back projection convolutional kernel. The back projection convolutional kernel used within iteration is particularly preferably predefined such that optimally high definition is achieved. What is known as a "RamLak kernel" (the name RamLak originates from the discoverers of this convolutional kernel, Ramachandran and Lakshminraynan), or a Shepp-Logan kernel (named after the developers of this convolutional kernel, Shepp and Logan) is expedient for this purpose.

In a further example variant of at least one embodiment of the inventive method separate material type image data for different types of material respectively is firstly generated from the image data of the current iterative stage before combination with the residue image data. By way of example, images can be generated for different contrast stages or materials, in particular it is possible to generate a bone image, i.e. a high-contrast image, and, furthermore, a soft tissue or water image which exhibits only lower contrasts. This material type image data is then subjected to separate filtering using a regularization convolutional kernel determined on the basis of the selected target convolutional kernel for the relevant type of material respectively. Only then does combination with the residue image data and also optionally with the image data from the current iterative stage take place. It is also particularly possible for filtering to be carried out for only one of the types of material, for example for the soft tissue image, i.e. a regularization convolutional kernel is only determined for this type of material. The image data of the other type of material, for example the bone image, can be combined unfiltered with the residue image data and with the filtered material type image data of the other type of material.

For this purpose the iterative reconstruction unit preferably comprises a filter unit with a separating unit which is adapted to generate separate material type image data for different types of material from the image data of the current iterative stage, before combination with the residue image data, and to separately filter this material type image data by using a regularization convolutional kernel determined for the respective type of material, before it is then combined with the residue image data again.

Basically it is also possible to provide separation into more than two different types of material, wherein care should be taken that the improvement in image quality is gained by correspondingly higher calculational effort.

In a further preferred variant local weighting can take place when combining the material type image data with the residue image data. Basically, however, all image data may also be weighted equally.

The input projection data is in each case preferably obtained on the basis of projection measured data acquired by way of the X-ray computerized tomography system, the data firstly being subjected to a beam hardening correction. This beam hardening correction can be directly applied to the measured data. In a preferred variant it can, however, also be carried out on the data that has already been pre-processed, i.e. in particular subjected to rebinning. The effect of what is referred to as "beam hardening" occurs as, on the one hand, the radiation emitted by an x-ray source has a polychromatic spectrum and, on the other hand, the absorption of the X-rays in the examined object is energy-dependent. This leads to shifting of the mean energy of the x-ray radiation to higher values as a function of which material is being radiographed and how thick the material is. The longer the radiographed section in the body, the more intense the beam hardening. The beam hardening effect leads to undesirable image artifacts in the reconstructed image of the radiographed body layer and these can affect precise medical interpretation of an image in particular. Various algorithms are known for correcting such beam hardening-induced artifacts. The drawback of these methods again lies in the fact that back projection is used in conjunction with a normal convolutional kernel in this case as well and can reduce image definition. By having beam hardening precede iteration it may be ensured that the low-pass filtering induced within the framework of the beam hardening correction, i.e. image definition reduction, can be compensated for again within the iterative reconstruction.

In a particularly preferred example embodiment interim image data, i.e. provisional image data, is reconstructed from the projection measured data, or the projection measured data that has been pre-processed as described above, for the beam hardening correction. This can take place using a conventional convolutional back projection. First structure image data of a first type of material is then segmented from this interim image data. This can be, for example, structure image data of a certain tissue type, for example of the bone structure, or image data with which a contrast medium should be associated. Conventional segmenting methods can be used for this purpose.

On the basis of this first structure image data first structure projection data can then be generated by a forward projection. This is projection data on whose basis it would be possible to reconstruct the first structure image data, i.e. ultimately synthetic projection data is generated which would be measured if only the relevant structure of the type of material selected in each case were to be present in the beam path. The beam hardening-corrected projection data can then be determined on the basis of this first structure projection data and the actually measured projection measured data.

To carry out this preferred method variant the beam hardening correction unit preferably comprises an interim image reconstruction unit which is adapted to reconstruct interim image data from the projection measured data. The beam hardening correction unit also comprises a segmenting unit which is constructed to segment first structure image data of a predefined first type of material from the interim image data, and a projection data-generating unit which is adapted to generate first structure projection data on the basis of the first structure image data. The actual correction unit is then connected downstream and is adapted to determine the beam hardening-corrected projection data on the basis of the first structure projection data and the projection measured data.

Beam hardening-corrected second structure projection data of a predefined second type of material is particularly preferably determined on the basis of the first structure projection data and the projection measured data. This second type of material can, for example, be a different tissue type, preferably soft tissue. Alternatively second structure projection data is determined for a type of material similar to the relevant soft tissue, for example water. This second structure projection data is projection data on whose basis it would be possible to reconstruct second structure image data, i.e. these are synthetic measured values which would have been measured if only structures of the second type of material had been present during projection in the beam path. The first structure projection data and the second structure projection data can then be suitably combined while forming the beam hardening-corrected projection data.

A correction data table, which has been created on the basis of measurements and/or simulations for various material thickness combinations for example, can preferably be used for beam hardening correction.

BRIEF DESCRIPTION OF THE DRAWINGS

The invention will be described again in more detail hereinafter with reference to the accompanying figures and with the aid of example embodiments. In the drawings:

FIG. 3 shows a schematic diagram of an example embodiment of an inventive image reconstruction device with a depiction of the interaction between the individual components and the respective output and input data, FIG. 4 shows a schematic diagram of an example embodiment of a beam hardening correction unit for an image reconstruction device according to FIG. 3 with a depiction of the interaction between the individual components and the respective output and input data.

DETAILED DESCRIPTION OF THE EXAMPLE EMBODIMENTS

Figure 1:
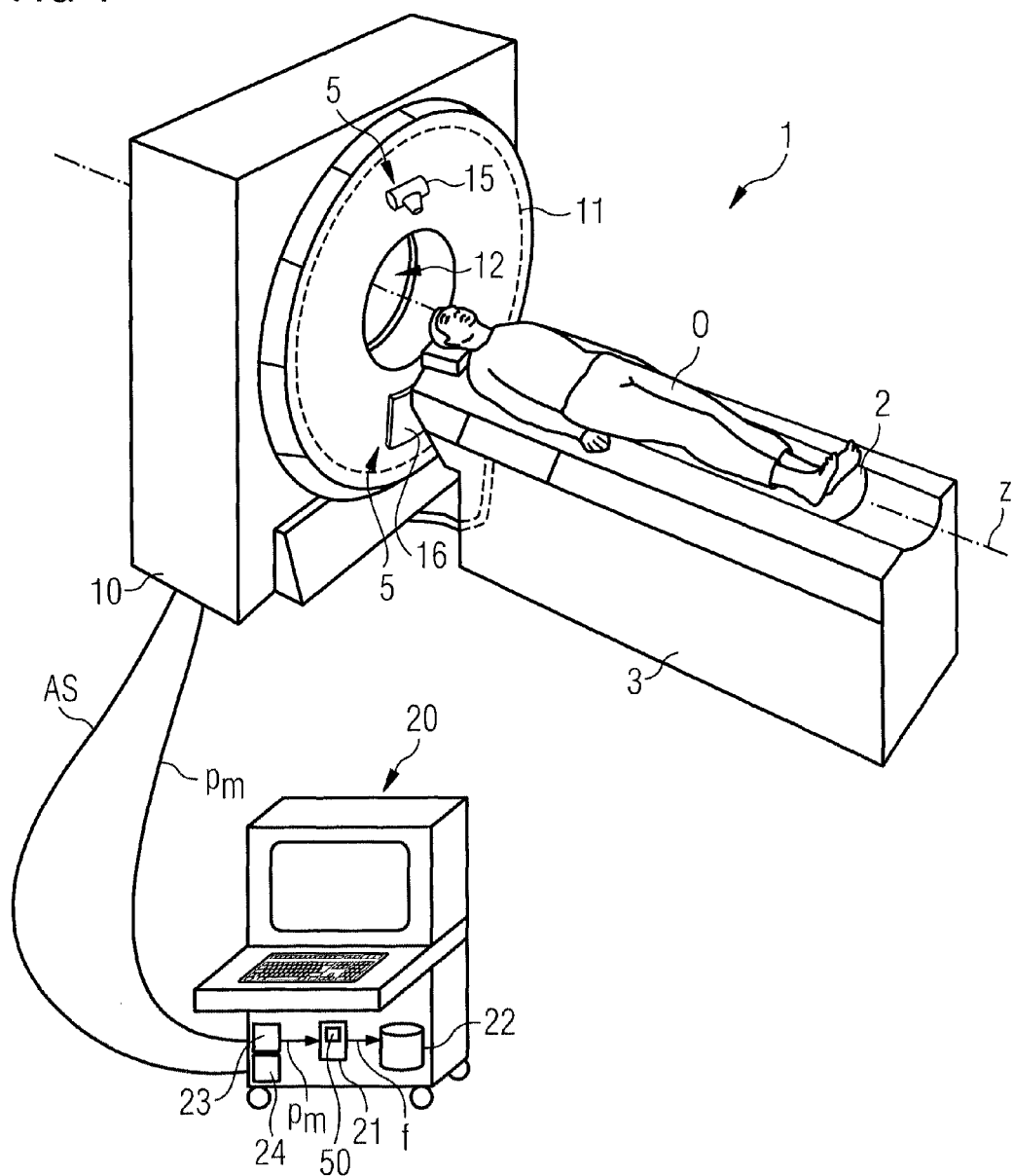
FIG. 1 shows a schematic diagram of an example embodiment of a computerized tomography system having an image reconstruction device.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 firstly schematically shows a computerized tomography system 1 with an image reconstruction unit 21, this being an inventive image reconstruction unit with a target convolutional kernel selection unit 50.

The CT system 1 substantially comprises a conventional scanner 10 in which, on a gantry 11, a detector system 5 with a detector 16 and an X-ray source 15 located opposite the detector 16 revolves around a measuring chamber 12. A patient-bearing device 3 or a patient couch 3, the upper part 2 of which, with a patient O located thereon, can be displaced toward the scanner 10, is situated upstream of the scanner 10 to move the patient O through the measuring chamber 12 relative to the detector system 16. The scanner 10 and the patient couch 3 are controlled by a controller 20 from which acquisition control signals AS emanate via a conventional control interface 24 to conventionally control the entire system according to predefined measuring protocols. The movement of the patient O in the z direction, which matches the system axis z lengthwise through the measuring chamber 12, and the simultaneous revolution of the X-ray source 15 produce a helical path for the X-ray source 15 relative to the patient O during measurement. The detector 16 runs concurrently therewith and always opposite the X-ray source 15 in order to capture projection measured data $p_m$ which is then used in the manner according to an embodiment of the invention to reconstruct volume image data.

A sequential measuring method may also be carried out in which a fixed position in the z direction is approached and then the required projection measured data $p_m$ is captured at the relevant z position during a revolution, partial revolution or a plurality of revolutions in order to reconstruct a section image at this z position or to reconstruct volume image data from the projection data from a plurality of z positions. Embodiments of the inventive method can basically also be used in other CT systems, for example with a plurality of X-ray sources and/or detectors and/or with a detector that forms a complete ring.

The projection measured data $p_m$ (also called raw data hereinafter) acquired from detector 16 is passed via a raw data interface 23 to the controller 20. This raw data, optionally following suitable pre-processing in the above-described manner, is then processed further in an image reconstruction device 21 which in this example embodiment is implemented in the controller 20 in the form of software on a processor. This image reconstruction device 21 will be described in more detail hereinafter with reference to FIGS. 2 to 6.

The image data f reconstructed by the image reconstruction device 21 is then stored in a memory 22 of the controller 20 and/or conventionally output on the screen of the controller 20. It may also be fed via an interface (not shown in FIG. 1) into a network connected to the computerized tomography system, for example a radiological information system (RIS), and be stored in a mass storage device that can be accessed there, or be output as images on printers or filming stations that are connected there. The data may thus be further processed in any desired manner and is then stored or output.

The mathematical basis for carrying out the iterative reconstruction that is executed in the image reconstruction device 21 will firstly be described hereinafter:

During iteration the image data $f_k$ is updated in each iterative stage k=0, 1, 2, . . . . This may be described by the following equation:

$$f_{k+1} = f_k + \alpha \cdot \mathrm{grad}_f(z) \quad (1)$$

The parameter $\alpha$ designates a relaxation parameter which controls the speed of convergence. This preferably has the value 0.7. A different value, preferably in the range from 0 to 1, may also be selected, however.

The term $\mathrm{grad}_f(z)$ is the gradient of what is known as the target function x in the attenuation distribution f (i.e. the actual image data f) which is given by the equation $$z(f) = \|Af - p_c\|_K^2 + R(f) \quad (2)$$

A is the projection operator used. It is selected such that the real measuring process is well depicted mathematically and is therefore predefined as a function of the measuring process, and in particular the measuring system. $p_c$ represents the input projection data.

The scalar product in the first part of the sum in equation (2) is defined as follows:

$$\|Af - p_c\|_K^2 = (Af - p_c)^T \cdot K \cdot (Af - p_c) \quad (3)$$

The operator K is a convolutional kernel here which describes the convolution of the projection data. K should be selected such that optimally high definition is achieved in the back projection. It is therefore also fixed. The term Af describes the operator A, applied to the image data f, and therefore matches the synthetic projection data $p_s$ shown in FIG. 2.

R(f) in equation (2) is the regularization term which is given by equation $$R(f) = \beta \cdot \sum_{i,j}^{N} d_{i,j} \cdot V(f_i - f_j) \quad (4)$$

V is, for example, a quadratic potential function with which the gray scale differences of adjacent image voxels at a spacing of $1/d_{i,j}$ are weighted. Other functions or weightings are also possible, however. i and j are control variables which each extend via the number N of voxels present in an image. $\beta$ designates the regularization intensity that regulates the amount of the regularization term with respect to the correction image in the $k^{th}$ iteration. Preferred values for $\beta$ lie between 1.5 and 2.5. As already mentioned, the stability of the reconstruction is enforced by this regularization term R(f). As the regularization term R(f) may also be regarded in mathematical terms as a convolutional kernel, it is also called regularization convolutional kernel R here.

Overall $\mathrm{grad}_f(z)$ therefore results in:

$$\mathrm{grad}_f(z) = 2 \cdot A^T K(Af - p_c) + \beta \sum_{i=1}^{N} e_i \sum_{j=1}^{N} d_{i,j} \cdot \frac{dV(f_i - f_j)}{df} \quad (5)$$

$e_i$ designates the $i^{th}$ unit vector in the image space herein, i.e. $e_i = (0, \ldots, 0, 1, 0, \ldots, 0)$. In mathematical terms the iterative reconstruction within the framework of a steepest descent method therefore leads to a minimization of the target function z, defined by equation (2), of the attenuation distribution f or image data f.

It may be shown that the reconstruction for k→∞ formulated by the above equations converges against the convergence image $$f_\infty = (A^T \cdot K \cdot A + \beta R)^{-1} \cdot A^T \cdot K \cdot p_c \quad (6)$$

(J. Sunnegårdh, "Combining Analytical and Iterative Reconstruction in Helical Cone-Beam-CT", Thesis No. 1301, Linköpink Studies in Science and Technology, 2007, the entire contents of which are hereby incorporated herein by reference).

Equation (6) is unlimited if the potential function V is quadratic and what is known as the "Influence Function" dV/df is linear. In this case the iteration equation (1) is a linear depiction of the image data f. Furthermore, equation (6) also applies whenever there are only relatively small contrasts in the image data, for example in the case of soft tissue image data, in which the adjustment of the image characteristics is particularly important. In this case the "Influence Function" dV/df is independent of the specific choice of the potential V, i.e. even if V is not quadratic, dV/df can be at least locally linearized. The inventive method can therefore also expediently be used if the potential function V was, by way of exception, not selected to be quadratic.

According to an embodiment of the invention a target convergence image $f_\infty$ should be achieved which has image characteristics, which, when reconstructing image data from the input projection data $p_c$ by way of simple filtered back projection, would be achieved with a specific target or desired convolutional kernel W. This means the convergence image should satisfy the following condition:

$$f_\infty = A^T \cdot W \cdot p_c \qquad (7)$$

Equating equations (6) and (7) results in $$(A^T \cdot K \cdot A + \beta R)^{-1} \cdot A^T \cdot K = A^T \cdot W \qquad (8)$$

The variable $p_c$ in the two equations (6) and (7) for the input projection data could be eliminated here, so equation (8) is independent of input projection data $p_c$. It can immediately be seen from equation (8) that with a given operator A, a given convolutional kernel K can be calculated for simple back projection within the iteration loop, and with a given regularization intensity β of the sought regularization convolutional kernel R as a function of a target convolutional kernel W selected by a user.

The actual procedure when calculating within the framework of the iterative reconstruction may be depicted more easily using an example in the frequency domain. It is assumed in this connection that the reconstruction $A^T K$ is a WFBT reconstruction (WFBT=Weighted Filtered Back Projection), as is described in the article "Weighted FBP—a simple approximate 3D FBP algorithm for multislice spiral CT with good dose usage for arbitrary pitch" by Karl Stiersdorfer, Annabella Rauscher, Jan Boese, Herbert Bruder, Stefan Schaller and Thomas Flor in Phys. Med. Biol. 49 (2004), 2009-2218, the entire contents of which are hereby incorporated herein by reference. This is therefore a filtered back projection with a specific kernel K and a voxel-driven 3D back projection with bilinear interpolation.

When using a very fine parallel grid a, which matches the spacings of the detector channels, and a pixel width s, equation (8) may be transformed as follows to obtain a ratio for the modulation transfer functions:

$$\sin c^2 \cdot (\pi \cdot \rho \cdot a) \cdot M_W = (\sin c^2 \cdot (\pi \cdot \rho \cdot a) \cdot M_W \sin c^2 \cdot (\pi \cdot \rho \cdot s) + \beta M_R)^{-1} \cdot \sin c^2 \cdot (\pi \cdot \rho \cdot a) \cdot M_W \qquad (9)$$

In this equation the term $\sin c^2 \cdot (\pi \cdot \rho \cdot a)$ corresponds to a linear interpolation within the back projection step and $\sin c^2 \cdot (\pi \cdot \rho \cdot a)$ corresponds to the linear interpolation in forward projector A. The factor $M_K$ corresponds to the convolutional kernel K, factor $M_W$ to convolutional kernel W and factor $M_R$ to the regularization convolutional kernel R. This means multiplication by the respective factor in the frequency domain corresponds to the convolution with the respective convolutional kernel in the position space.

Equation (9) can then be resolved according to $M_R$. The following equation is produced in a special case where a kernel K is selected such that $M_K=1$, for example when using a RamLak kernel:

$$M_R = \frac{1}{\beta} \cdot \left( \frac{1}{M_W} \cdot \sin c^2 \cdot (\pi \cdot \rho \cdot a) \cdot \sin c^2 \cdot (\pi \cdot \rho \cdot s) \right) \qquad (10)$$

In other cases equation (10) looks a little more complicated. In the practical case $M_R$ may easily be calculated in this case as well, however.

If factor $M_R$ is known, then, using this factor in each iterative step according to equation (1), $grad_f(z)$ can be calculated according to equation (5), where equation (5) reads as follows in a slightly different notation with regularization convolutional kernel R:

$$grad_f(z) = 2 \cdot A^T \cdot K \cdot (A \cdot f - p_c) + \beta \cdot R \cdot f \qquad (5')$$

In the iteration according to equation (1) the current image data f is therefore convoluted with the regularization convolutional kernel R according to equation (5') every time, and in the frequency domain this corresponds to multiplication by the factor $M_R$. If, therefore, $M_R$ has been determined for example with equation (10), then it is only necessary to apply a Fourier transformation to the image data f, multiply the result by the factor $M_R$ and subsequently carry out an inverse two-dimensional Fourier transformation to practically implement convolution of the image data. This ensures that the desired convolution is carried out in the position space according to the regularization convolutional kernel R determined by the target convolutional kernel W.

Figure 2:
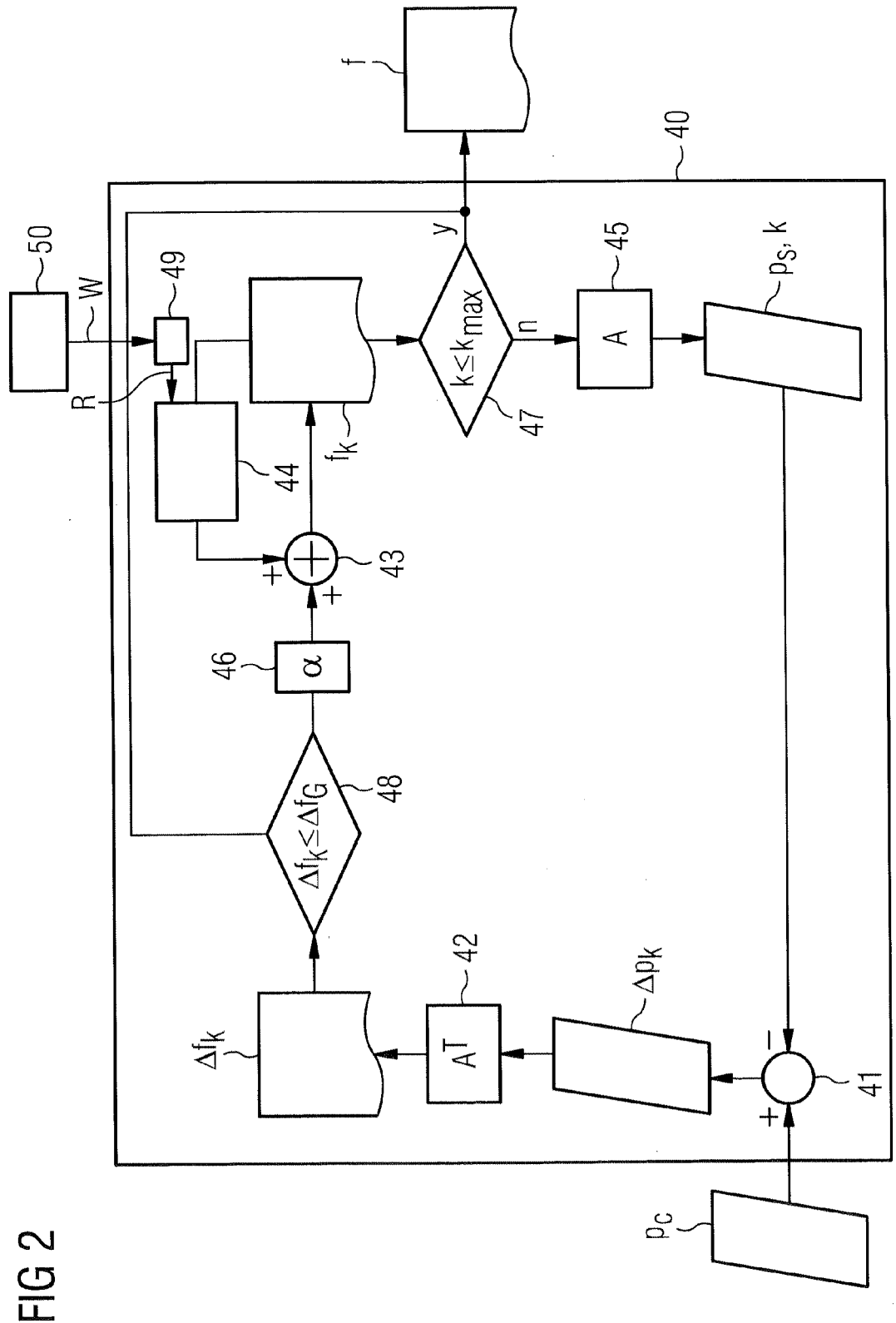
FIG. 2 shows a schematic diagram of a first example embodiment of an iterative reconstruction unit for an inventive image reconstruction device having a target convolutional kernel selection unit and a depiction of the interaction between the individual components and the respective output and input data.

FIG. 2 schematically shows the structure and the mode of operation of the iteration loop in the iterative reconstruction unit 40.

Firstly initial image data $f_{k=0}$ is generated from the incoming input projection data $p_c$. The image data $f_k$ within the iterative reconstruction unit 40 is shown top right in the figure. Synthetic projection data $p_{s,k=0}$ is generated from this initial image data $f_{k=0}$ with the aid of a projection operation A in a forward projection (in function block 45). What is known as the Josephson projector can be used here by way of example. This calculates the linear integrals along pencil beams. The difference between this synthetic projection data $\Delta p_{s,k=0}$ and the measured input projection data $p_c$ is then formed in a combination operator 41. The result is the difference projection data $\Delta p_k$. This difference projection data $\Delta p_k$ is back projected in function block 42 with the operator $A^T$ adjoint to projection operator A to calculate a residue image, i.e. to determine residue image data $\Delta f_{k=0}$. The residue image data $\Delta f_{k=0}$ is then (optionally with prior weighting with the above-described multiplier α in function block 46) used within a combination unit 43 to update the initial image data $f_{k=0}$ and thus generate the image data of the next iterative step $\Delta f_{k=1}$.

According to an embodiment of the invention the image data $f_{k=0}$ of the current iterative step k=0 is processed in advance in a filter unit 44 with a low-pass filter operator. This filtering takes place, as already described above in connection with the mathematical basis of the iteration loop, while taking account of a regularization convolutional kernel R which is determined on the basis of a target convolutional kernel W selected in advance for the respective reconstruction.

The target convolutional kernel W can be selected by means of the target convolutional kernel selection unit 50 in this case. This may, for example, be a software module within a user interface of the controller or image processing device on which the entire reconstruction is carried out. By way of example, as has previously been conventional, a user can be offered a large number of suitable convolutional kernels in a menu and he then selects the appropriate target convolutional kernel W on the basis of his experiences and requirements. The desired kernel W can also be indicated by direct selection of image characteristics which have been brought about by the desired kernel. This target convolutional kernel W is then passed to a regularization convolutional kernel calculation unit 49 which calculates the regularization convolutional kernel R in the manner described within the framework of the mathematical descriptions. Reference is again made at this point to the fact that calculation of the regularization convolutional kernel R is also taken to mean calculation of the associated factor $M_R$ by which the image data can be multiplied for filtering in the frequency domain, instead of carrying out convolution with the corresponding convolutional kernel directly in the position space. Calculation of the factor respectively associated with the convolutional kernel should therefore be equated with calculation of the convolutional kernel itself within the scope of an embodiment of the invention.

The loop where k=1 is then run through again to generate image data $f_{k=2}$ in the next iterative step k=2, etc.

Explicit reference is also made to that fact that the loop in FIG. 2 can also be half run through once for initial construction of the first image data $f_{k=0}$ from the beam hardening-corrected projection data $p_c$. Initially no synthetic projection data $p_{s,k}$ exists, i.e. $p_{s,k}$ can be equated to 0. The difference projection data $\Delta p_k$ therefore corresponds to the input projection data $p_c$, so the residue image data $\Delta f_k$ ultimately already corresponds to the desired initial image data which, with suitable selection of the factor α, can be directly accepted in the loop as initial image data $f_{k=0}$ in the first step. Consequently only the factor α=1 has to be set during the first run of the loop. Alternatively it is also possible, by avoiding the loop, to generate the initial image data from the input projection data $p_c$ and to start the loop at $f_k$ (top right in block 40 of FIG. 4).

The iteration loop is continued up until a predefined termination criterion. The easiest way is termination following a certain number of iterative passes. An inquiry of this kind can be made, for example, in the inquiry function block 47 by comparing the iteration control variable k with a maximum value $k_{max}$. If this value is attained, the image data f is output, otherwise the loop is run though again. Checking of the residue image is also possible as an alternative or in addition. This variant is shown as inquiry function block 48. Here it is checked whether the current residue image $\Delta f_k$ is below a limiting value that is to be defined in a suitable manner. If yes it is assumed that the convergence is sufficiently far advanced and the current image data, or image data updated in the next pass, can be output as complete image data f. Further termination criteria are also conceivable, for example checking for whether the difference projection data $\Delta p_k$ is below a certain limiting value $\Delta p_G$.

FIG. 3 shows an example embodiment of an image reconstruction device 21 with a beam hardening correction unit 30, connected upstream of the inventive iterative reconstruction unit 40, and the input and output data for the individual components of this image reconstruction device 21. At the start the image reconstruction device 21 comprises a projection measured data interface 25. This accepts the projection measured data $p_M$ and from there it is passed to a beam hardening correction unit 30 which will be described hereinafter with reference to FIG. 4. The projection measured data $p_M$ is firstly beam hardening-corrected in the beam hardening correction unit 30 to thus generate the input projection data $p_c$ for the downstream iterative reconstruction unit 40. The image data f generated by using the target convolutional kernel W selected with the target convolutional kernel selection unit 50 is then stored in a memory 22 for example via an image data interface 26 and can be retrieved from there again for further processing, to generate for example certain section images from volume image data or the like.

FIG. 4 describes the beam hardening correction unit 30 in slightly more detail. The accepted projection measured data $p_m$ is firstly passed in the beam hardening correction unit 30 to a correction unit 35, whose function will be described later, and secondly to an interim image reconstruction unit 31. Interim image data $f_I$ is reconstructed in this interim image reconstruction unit 31 by applying a conventional back projection convolution, the data then being passed to a segmenting unit 32. The bone structures, for example, are segmented in this segmenting unit 32 and a bone image or bone image data $f_b$ is thus generated. This segmenting can take place using a conventional segmenting method. Instead of bone material, segmenting of other specific material, for example vessels filled with contrast medium, can also take place here if this is expedient in the context of the images to be evaluated. In this regard the bone image data $f_b$ can also be generally designated first structure image data $f_b$.

The bone image data $f_b$ is accepted by a projection data generating unit 33 which, with a forward projection operator that optimally depicts the measuring method in mathematical terms, generates bone structure projection data $p_b$ (more generally: first structure projection data $p_b$) therefrom. This is likewise passed to the correction unit 35.

The correction mechanism in the correction unit 35 uses the bone projection data $P_b$ and the projection measured data $P_m$ to determine with the aid of a look-up table LUT, which is stored in a memory 34, water projection data for monochromatic radiation, i.e. beam hardening-corrected water projection data $p_w$. This takes place in a projection data determining unit 36. The water projection data $p_w$ is then combined, for example simply added, with/to the bone projection data $p_b$ in the combination unit 37 to generate the desired beam hardening-corrected projection data $p_c$ therefrom.

The entire correction mechanism is based on the assumption that the generated bone projection data $p_b$ can be adopted as quasi-monochromatic data, i.e. beam hardening-corrected data. The look-up table LUT was determined in advance with the aid of test measurements or simulations. Polychromatic X-ray radiation is radiated vertically through a wedge arrangement in the process and polychromatic line integrals, i.e. projection values, are thus generated for water and bone, for example, as a function of the radiographed water and bone thicknesses. The water thickness may in turn be derived from these material combination-dependent, polychromatic line integrals and the bone thickness. The bone thickness, however, can in turn be inversely derived from the bone projection data $p_b$. Monochromatic water projection values $p_w$ may therefore be determined which then only have to be mixed with the quasi-monochromatic bone projection values $p_b$ to obtain quasi-monochromatic, beam hardening-corrected overall projection values $p_c$ which can then be used as input projection values $p_c$ for the iterative reconstruction. Water is used as an equivalent to soft tissue in this connection. A similar method is used in DE 100 36 142 B4 (the entire contents of which are hereby incorporated herein by reference) where, however, the correction is applied to completely reconstructed images from which sectional images are generated respectively to thus reconstruct the complete image. With regard to the basic mathematical and physical principles for the measuring setup and for the simulation for determining the look-up table LUT, reference can be made to the statements in this document, however. A separation of soft tissue and bone material is assumed in the present explanations. The method can, however, also be used with other materials, for example soft tissue and contrast medium. It is only necessary to use a look-up table LUT accordingly determined therefor in this case.

Figure 5:
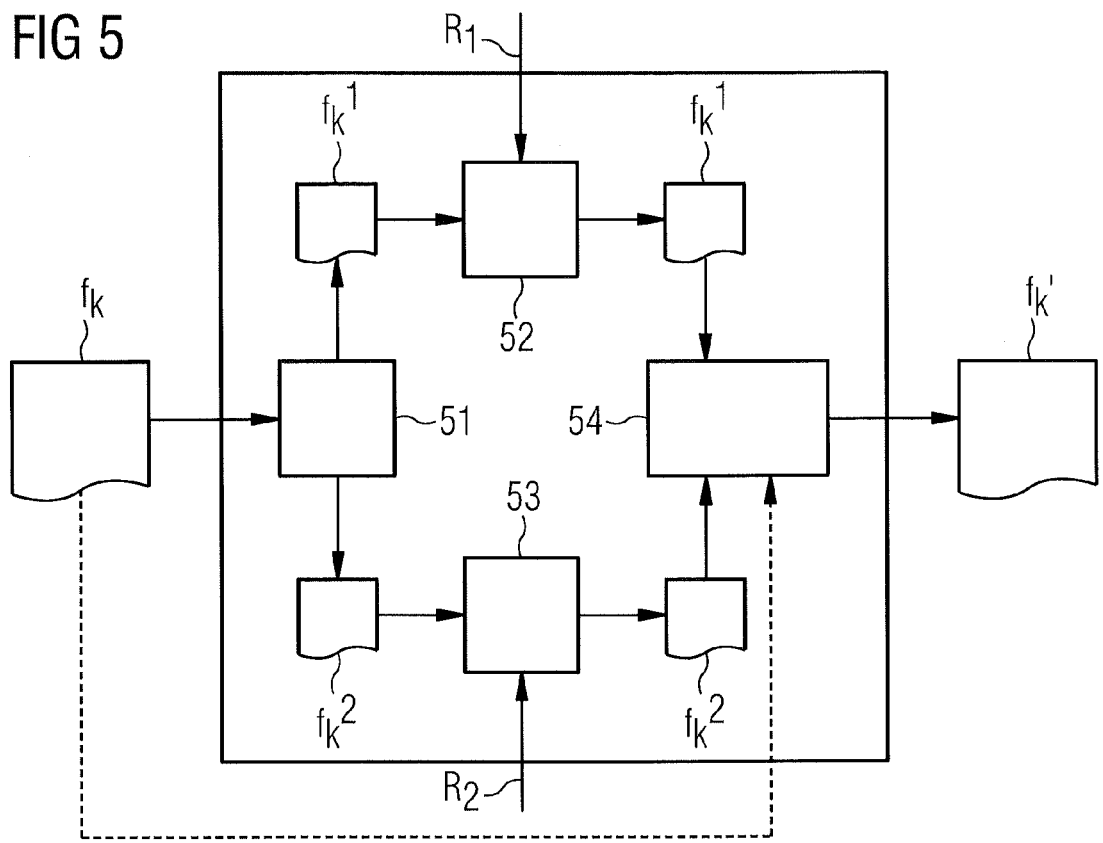
FIG. 5 shows a schematic diagram of a filter unit with a separation unit for a second example embodiment of an iterative construction unit for an inventive image reconstruction device with a depiction of the interaction between the individual components and the respective output and input data.

FIG. 5 shows a variant for a filter device 44' with which further improvement in image quality is possible within the iterative reconstruction. This principle is based on the fact that filtering is not carried out in the same way for all materials in the image, instead the image data $f_k$ of the current iterative stage, which is combined with the residue image data within the combination unit 43 to generate the image data of the next iterative step, is firstly segmented in a separating unit 51 to generate different material type image data $f_k^1$, $f_k^2$. The first material type image data $f_k^1$ is, for example, a bone image, i.e. a high-contrast image. The second material type image data $f_k^2$ is low-contrast soft tissue image on the other hand. The separating unit 51 can operate like a conventional segmenting unit in this case, as has also already been described in FIG. 4 in connection with the beam hardening correction.

The different material type image data $f_k^1$, $f_k^2$ is then separately filtered in each case and, more precisely, using first and second regularization convolutional kernels $R_1$, $R_2$ appropriate to the respective image data. This is symbolized in FIG. 5 by the separate filter function blocks 52, 53. The convolutional kernels $R_1$, $R_2$ can again be calculated for example by the regularization convolutional kernel calculation unit 49 (see FIG. 2) from the target convolutional kernel W selected by the operator. Furthermore, filtering proceeds mathematically in exactly the same way as when the complete update image $f_k$ is filtered in the manner according to the invention. This image data $f_k^1$, $f_k^2$ can again be mixed in a mixing unit 54 to from a common image $f_k'$. It is also possible for mixing to take place with the original update image $f_k$. The mixing unit can also be configured in this connection such that the different image data $f_k^1$, $f_k^2$ is not added up again with the same weight, rather a weighting of the individual image data $f_k^1$, $f_k^2$ is carried out to ensure that one type of image data dominates. In particular this may also be local—i.e. pixel-dependent—weighting in which it is decided which image data is more strongly weighted for each pixel. The image data generated by the mixer is then combined with the residue image data in the combination unit 43 instead of as a combination image $f_k'$. The mixing unit 54 can, moreover, be constructed with the combination unit 43 as an integrated unit.

Figure 6:
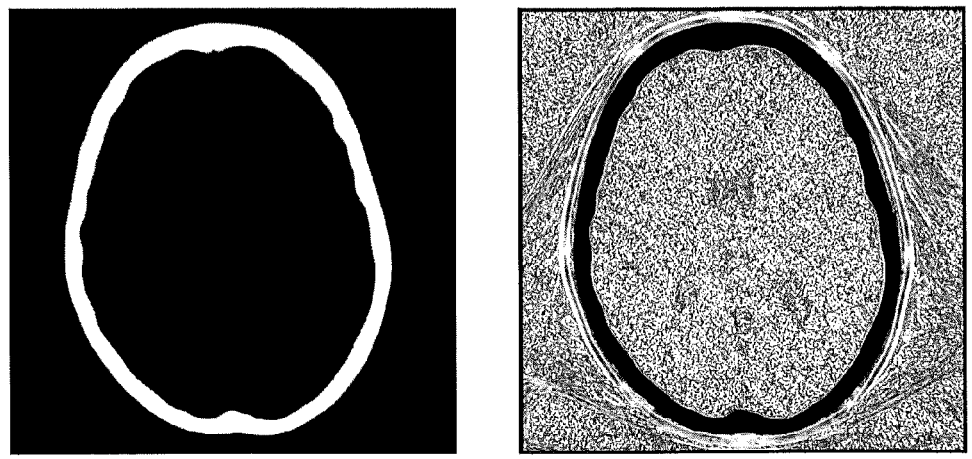
FIG. 6 shows a diagram of a bone image and soft tissue image segmented from a section image through a head.

In a further variant filtering is only carried out with a regularization filer kernel for one of the image data material types, while the image data of the other type of material is used unfiltered. By way of example, soft tissue image data only can be filtered and the high-contrast data, which is generated by the bone structure, is used again in the updating of the image data $f_k$ in the iteration without low-pass filtering, i.e. without using a regularization kernel, to retain the strong contrast in the process. As an example of this FIG. 6 shows a bone image (left-hand side) generated from a section image through a head and the associated soft tissue image (right-hand side), which has been filtered with a certain regularization filter. Such separate treatment of different image structures and recombination after filtering means it is possible to have an even greater influence on the image characteristics in order to generate optimum images.

The components shown in FIGS. 2 to 5 can be predominantly or wholly implemented on a suitable processor in the form of software elements. In particular the interfaces between these components may also be constructed purely in terms of software. It is only necessary for there to be access measures to suitable memory areas in which the data can be suitably buffered and retrieved and updated again at any time.

The method and the construction device have primarily been described with reference to a reconstruction of medical image data. The invention is not restricted to use in the medical sector, however, instead CT scans may, in principle, also be generated and processed for other purposes, for example for material testing or the like.

Finally reference is again made to the fact that the above-described method and devices are example embodiments of the invention, and that the invention may be varied by a person skilled in the art without departing from the field of the invention as far as it is specified by the claims. For the sake of completeness reference is also made to the fact that the use of the indefinite article "a" does not rule out the relevant features from also existing severalfold. Similarly, the term "unit" or "module" does not rule out these comprising a plurality of components which may optionally also be spatially scattered.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

LIST OF REFERENCE CHARACTERS 1 computerized tomography system
2 upper part of the patient couch
3 patient couch
5 detector system
10 scanner
11 gantry
12 measuring chamber
15 x-ray source
16 detector
20 controller
21 image reconstruction device
22 memory
23 raw data interface
24 control interface
25 projection measured data interface
26 image data interface
30 beam hardening correction unit
31 interim image reconstruction unit
32 segmenting unit
33 projection data generating unit
34 memory
35 correction unit
36 projection data determining unit
37 combination unit
40 iterative reconstruction unit
41 combination operator
42 function block
43 combination unit
44 filter unit
44' filter unit
45 function block
46 function block
47 inquiry function block
48 inquiry function block
49 regularization convolutional kernel calculation unit
50 target convolutional kernel selection unit
51 separating unit
52 filter function block
53 filter function block
54 mixer unit
AS acquisition control signal
O object/patient
z system axis
f image data
$f_{k=0}$ initial image data
$f_I$ interim image data
$f_b$ first structure image data/bone image data
$p_m$ projection measured data
$p_c$ beam hardening-corrected projection data
$p_b$ first structure projection data/bone structure projection data
$p_w$ second structure projection data/water projection data
$p_{s,k}$ synthetic projection data
A projection operator
$A^T$ adjoint projection operator
$\Delta f_k$ residue image data
$\Delta f_k$ limiting value
$\Delta p_k$ difference projection data
$\Delta p_G$ limiting value
α multiplier
k iterative control variable
$k_{max}$ maximum value
LUT correction data table/look-up table
$f_k^1$ first material type image data
$f_k^2$ second material type image data
$f_k'$ combination image
R regularization convolutional kernel
$R_1$ first regularization convolutional kernel
$R_2$ second regularization convolutional kernel

What is claimed is:

1. A method for reconstructing image data on the basis of input projection data obtained via an X-ray computerized tomography system, wherein a target convolutional kernel is selected and wherein image data are then reconstructed using an iterative reconstruction method comprising:
   reconstructing image data of a first iterative stage from the input projection data;
   generating synthetic projection data on the basis of the image data of a current iterative stage;
   forming difference projection data on the basis of the input projection data and the synthetic projection data;
   generating residue image data from the difference projection data;
   combining the residue image data with the image data of the current iterative stage to form image data of an additional iterative stage, wherein the image data of the current iterative stage is subjected to filtering before or during combination with the residue image data by using a regularization convolutional kernel which is determined on the basis of the selected target convolutional kernel; and
   repeating the generating synthetic projection data, forming difference projection data, generating residue image data and combining until a termination condition occurs.

2. The method as claimed in claim 1, wherein the regularization convolutional kernel is determined by taking account of a projection operator used when generating the synthetic projection data.

3. The method as claimed in claim 2, wherein the residue image data is generated from the difference projection data by way of a filtered back projection method using a back projection convolutional kernel, and wherein the regularization convolutional kernel is determined by taking account of the back projection convolutional kernel.

4. The method as claimed in claim 3, wherein a RamLak kernel or a Shepp-Logan kernel is used as the back projection convolutional kernel.

5. The method as claimed in claim 1, wherein the residue image data is generated from the difference projection data by way of a filtered back projection method using a back projection convolutional kernel, and wherein the regularization convolutional kernel is determined by taking account of the back projection convolutional kernel.

6. The method as claimed in claim 5, wherein a RamLak kernel or a Shepp-Logan kernel is used as the back projection convolutional kernel.

7. The method as claimed in claim 1, wherein separate material type image data for different types of material is generated from the image data of the current iterative stage, before combination with the residue image data, the material type image data is subjected to separate filtering by using a regularization convolutional kernel determined for the respective type of material and is then combined with the residue image data.

8. The method as claimed in claim 7, wherein local weighting takes place when combining the material type image data with the residue image data.

9. The method as claimed in claim 1, wherein iteration is terminated at the latest after a number of iterative steps.

10. The method as claimed in claim 1, wherein iteration is terminated at the latest when a convergence criterion is reached.

11. The method as claimed in claim 1, wherein the input projection data is obtained on the basis of projection measured data acquired via an X-ray computerized tomography system, the data firstly being subjected to a beam hardening correction.

12. The method as claimed in claim 11, wherein, for the beam hardening correction, interim image data is firstly reconstructed from the projection measured data and first structure image data of a first type of material is segmented from this interim image data and first structure projection data is generated on the basis of the first structure image data and the beam hardening-corrected projection data is determined on the basis of the first structure projection data and the projection measured data.

13. A method for generating image data from inside an object by way of an X-ray computerized tomography system, the method comprising:
    X-raying the object using X-ray radiation from a plurality of projection directions to acquire projection measured data; and
    reconstructing the image data on the basis of the projection measured data using the method as claimed in claim 11.

14. An image reconstruction device for reconstructing image data of an object, comprising:
    a projection data interface to accept input projection data obtained via an X-ray computerized tomography system;
    a target convolutional kernel selection unit to select a target convolutional kernel; and
    an iterative reconstruction unit, adapted to reconstruct image data based on the input projection data using an iterative reconstruction method, comprising:
        reconstructing image data of a first iterative stage from the input projection data,
        generating synthetic projection data on the basis of the image data of a current iterative stage,
        forming difference projection data on the basis of the input projection data and the synthetic projection data,
        generating residue image data from the difference projection data,
        combining the residue image data with the image data of the current iterative stage to form image data of an additional iterative stage, wherein the image data of the current iterative stage is subjected to filtering before or during combination with the residue image data by using a regularization convolutional kernel determined on the basis of the selected target convolutional kernel, and
        repeating the generating synthetic projection data, forming difference projection data, generating residue image data and combining until a termination condition occurs; and
    an image data interface to output the reconstructed image data.

15. The image reconstruction device as claimed in claim 14, wherein the iterative reconstruction unit comprises a filter unit including a separating unit, adapted to generate separate material type image data for different types of material from the image data of the current iterative stage, before combination with the residue image data, and to separately filter the material type image data by using a regularization convolutional kernel determined for the respective type of material, in order to then combine the material type image data with the residue image data.

16. An X-ray computerized tomography system comprising:
    a projection data acquisition unit;
    an X-ray source;
    a detector system to acquire projection measured data of an object; and
    the image reconstruction device as claimed in claim 14.

17. An X-ray computerized tomography system comprising:
    a projection data acquisition unit;
    an X-ray source;
    a detector system to acquire projection measured data of an object; and
    the image reconstruction device as claimed in claim 15.

18. A non-transitory computer readable medium including program segments for, when executed on a programmable image reconstruction device, causing the programmable image reconstruction device to implement the method of claim 1.

* * * * *